United States Patent
Hitt et al.

(10) Patent No.: US 9,276,948 B2
(45) Date of Patent: Mar. 1, 2016

(54) METHOD AND APPARATUS FOR IDENTIFYING A THREATENING NETWORK

(71) Applicant: 21CT, Inc., Austin, TX (US)

(72) Inventors: Laura Hitt, Austin, TX (US); Matt McClain, Austin, TX (US)

(73) Assignee: 21CT, Inc., Austin, TX (US)

( * ) Notice: Subject to any disclaimer, the term of this patent is extended or adjusted under 35 U.S.C. 154(b) by 544 days.

(21) Appl. No.: 13/730,191

(22) Filed: Dec. 28, 2012

(65) Prior Publication Data

US 2015/0229662 A1    Aug. 13, 2015

Related U.S. Application Data

(60) Provisional application No. 61/581,473, filed on Dec. 29, 2011.

(51) Int. Cl.
| | | |
|---|---|---|
| H04L 29/06 | (2006.01) | |
| G06F 11/00 | (2006.01) | |
| G06F 12/14 | (2006.01) | |
| G06F 12/16 | (2006.01) | |

(52) U.S. Cl.
CPC ........ *H04L 63/1425* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 7,480,712 B2 | 1/2009 | Moy | |
| 7,856,411 B2 * | 12/2010 | Darr | 706/45 |
| 2005/0206650 A1 * | 9/2005 | Nazzal | 345/594 |
| 2006/0075492 A1 * | 4/2006 | Golan et al. | 726/22 |
| 2007/0226796 A1 * | 9/2007 | Gilbert et al. | 726/22 |
| 2008/0109730 A1 * | 5/2008 | Coffman et al. | 715/733 |
| 2009/0135727 A1 * | 5/2009 | Agrawal et al. | 370/248 |
| 2010/0031156 A1 * | 2/2010 | Doyle et al. | 715/736 |
| 2011/0058499 A1 * | 3/2011 | Zhang et al. | 370/254 |
| 2012/0137367 A1 * | 5/2012 | Dupont et al. | 726/25 |
| 2012/0222089 A1 * | 8/2012 | Whelan et al. | 726/3 |

OTHER PUBLICATIONS

Shyu, Mei-Ling, et al., A Novel Anomaly Detection Scheme Based on Principal Component Classifier, 2003, In Proceedings of the IEEE Foundations and New Directions of Data Mining Workshop, in conjunction with the Third IEEE International Conference on Data Mining (ICDM'03), Melbourne, FL, pp. 172-179.

* cited by examiner

*Primary Examiner* — Shin-Hon Chen
(74) *Attorney, Agent, or Firm* — J. Roger Williams, Jr.

(57) ABSTRACT

A system and method for identifying a threatening network is provided. The system comprises a network movement before/after algorithm that provides a graphical plot of changes in networks' communications activity from before to after a key event occurs, so that an analyst is able to identify anomalous behavior; a network progression algorithm that provides a graphical plot to analyze behavior in small increments of time without specification or emphasis upon a particular event, so that the analyst is able to see a trend in behavioral changes; a statistical network anomaly ranking algorithm that provides as output a ranked list of the networks; and an anomaly trend graphs algorithm that analyzes and visualizes the networks' anomaly scores over time, so that the analyst is able to see which networks are consistently suspicious, which networks accumulate more suspiciousness in response to an event, and which networks are trending toward more suspiciousness.

15 Claims, 11 Drawing Sheets

EXAMPLES OF ANOMALY TREND GRAPHS

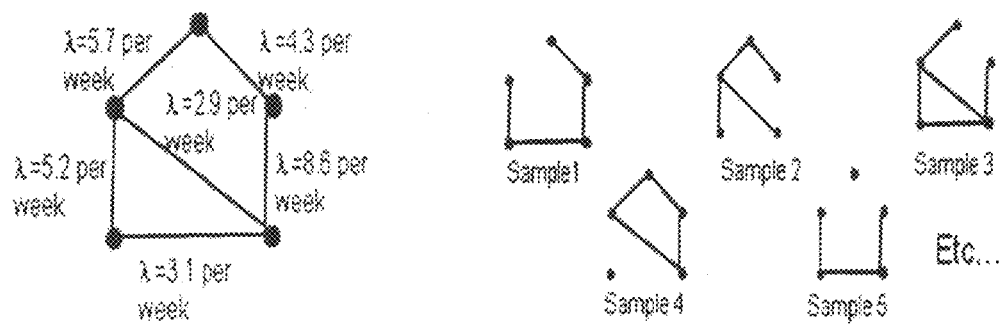
Figure 1: Example of Poisson sampling process
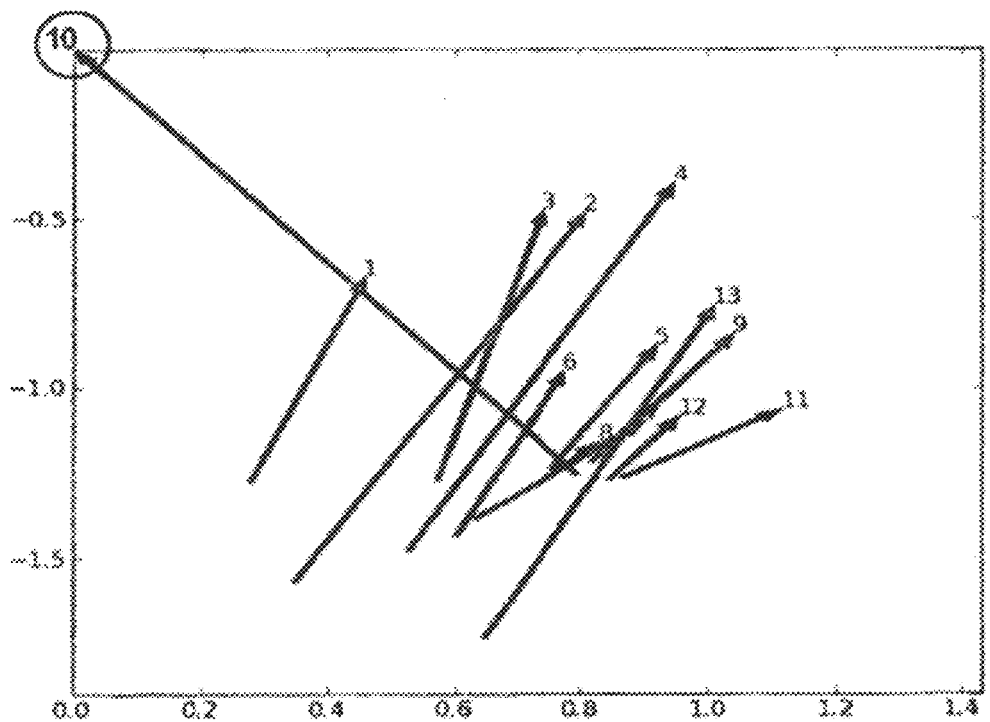
Figure 2: Network movement from before to after an event

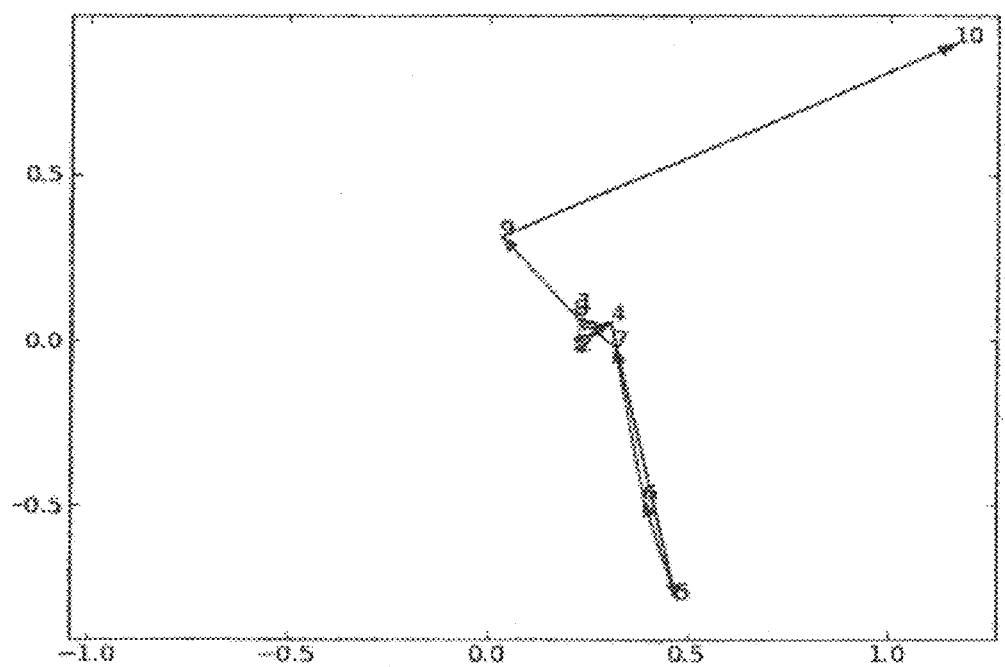
Figure 3: Network progression plots over time
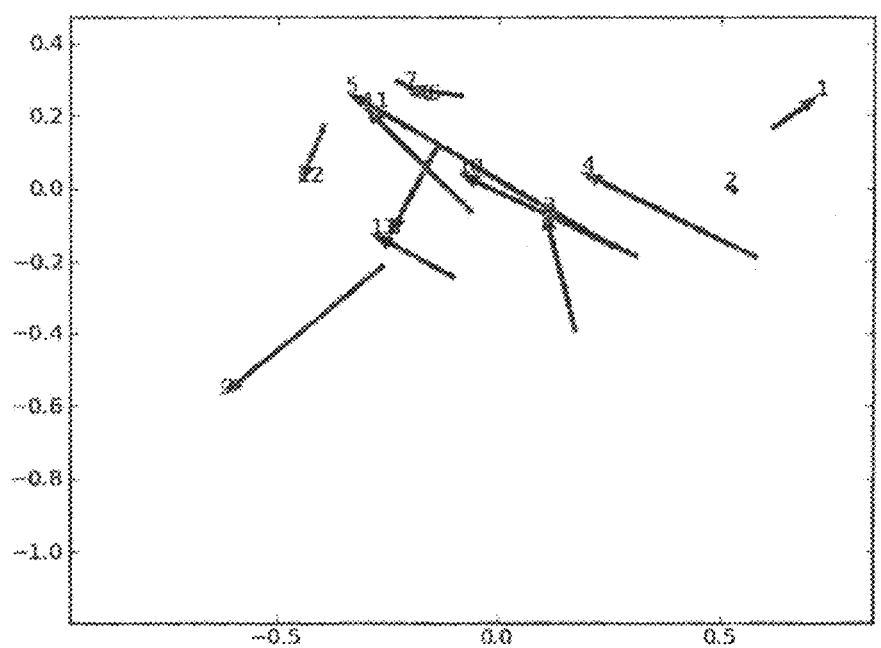
Figure 4: Plot of networks during a non-event time span; no clear anomaly is apparent

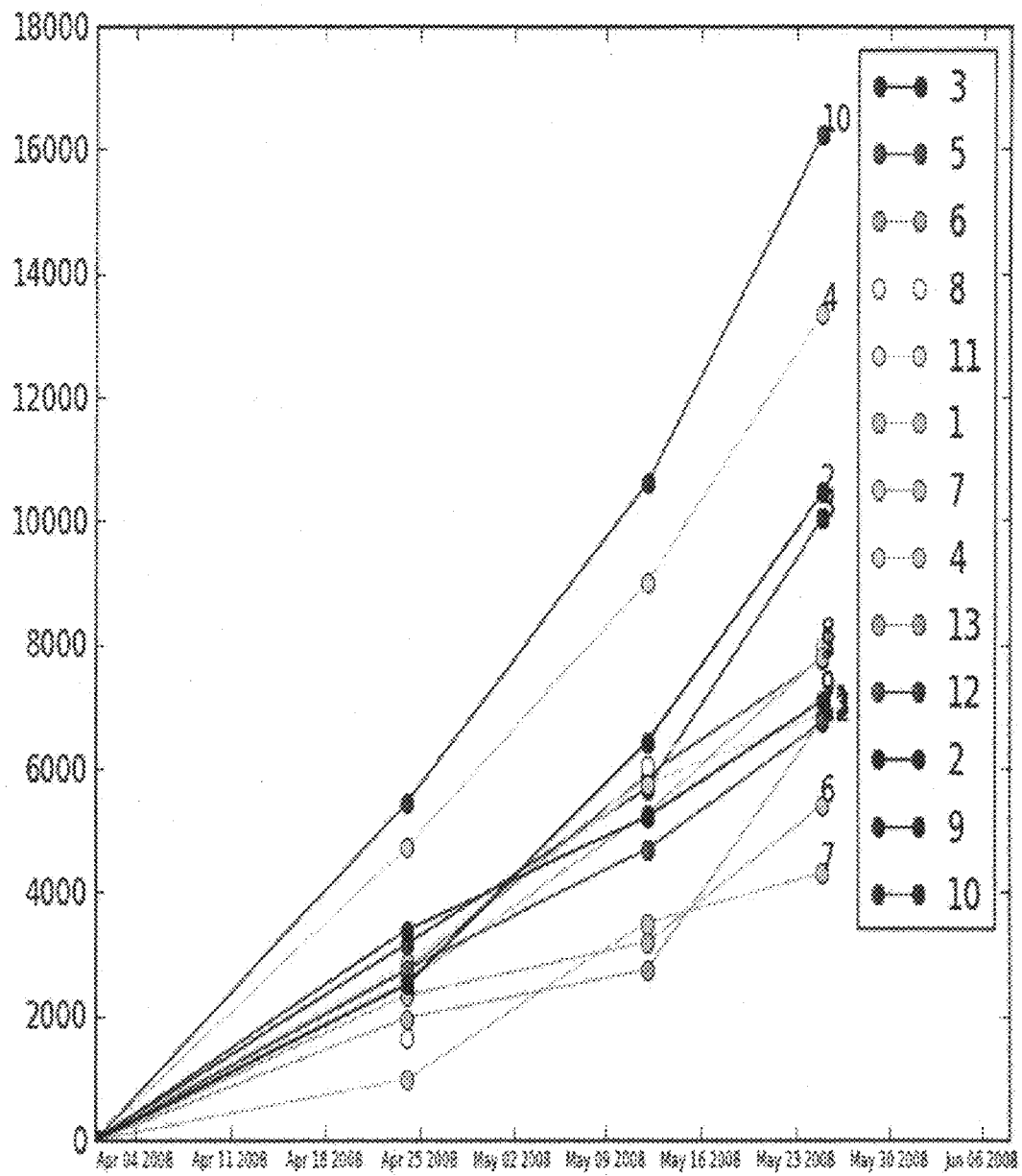
Figure 5: Anomaly trend graphs over time

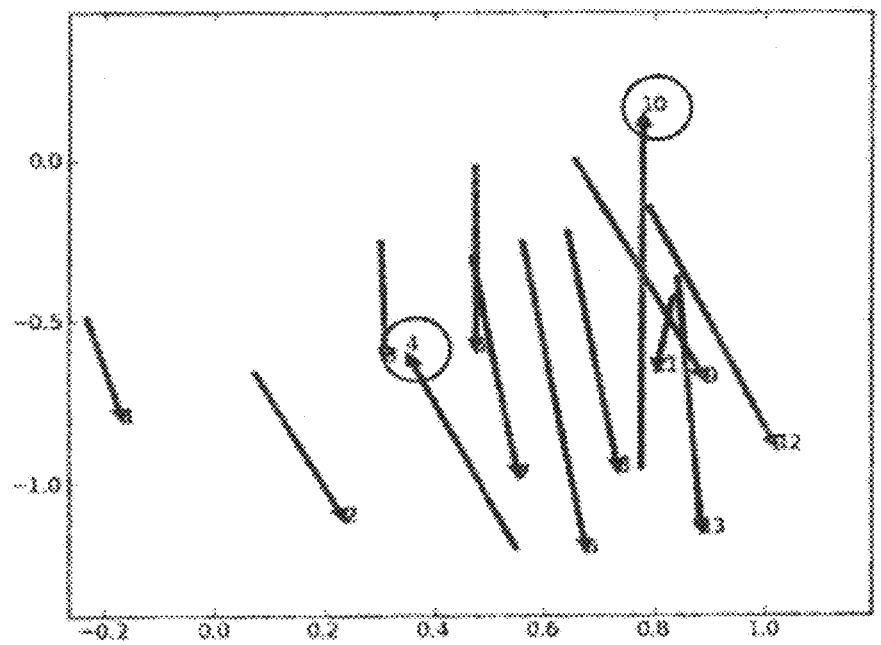
Figure 6: Plot of networks in reaction to the arrival of the Marines; networks #4 and 10 are clearly anomalous
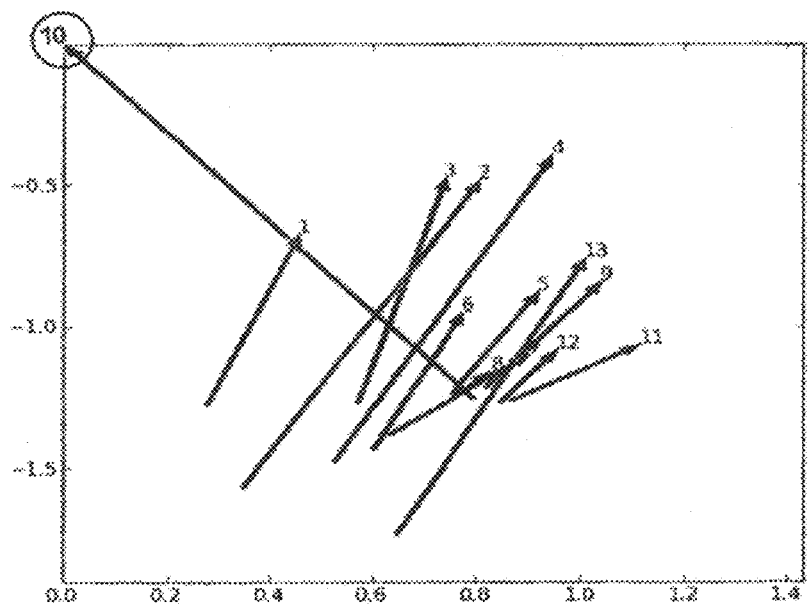
Figure 7: Plot of networks in response to the removal of a key leader; network #10 is clearly anomalous

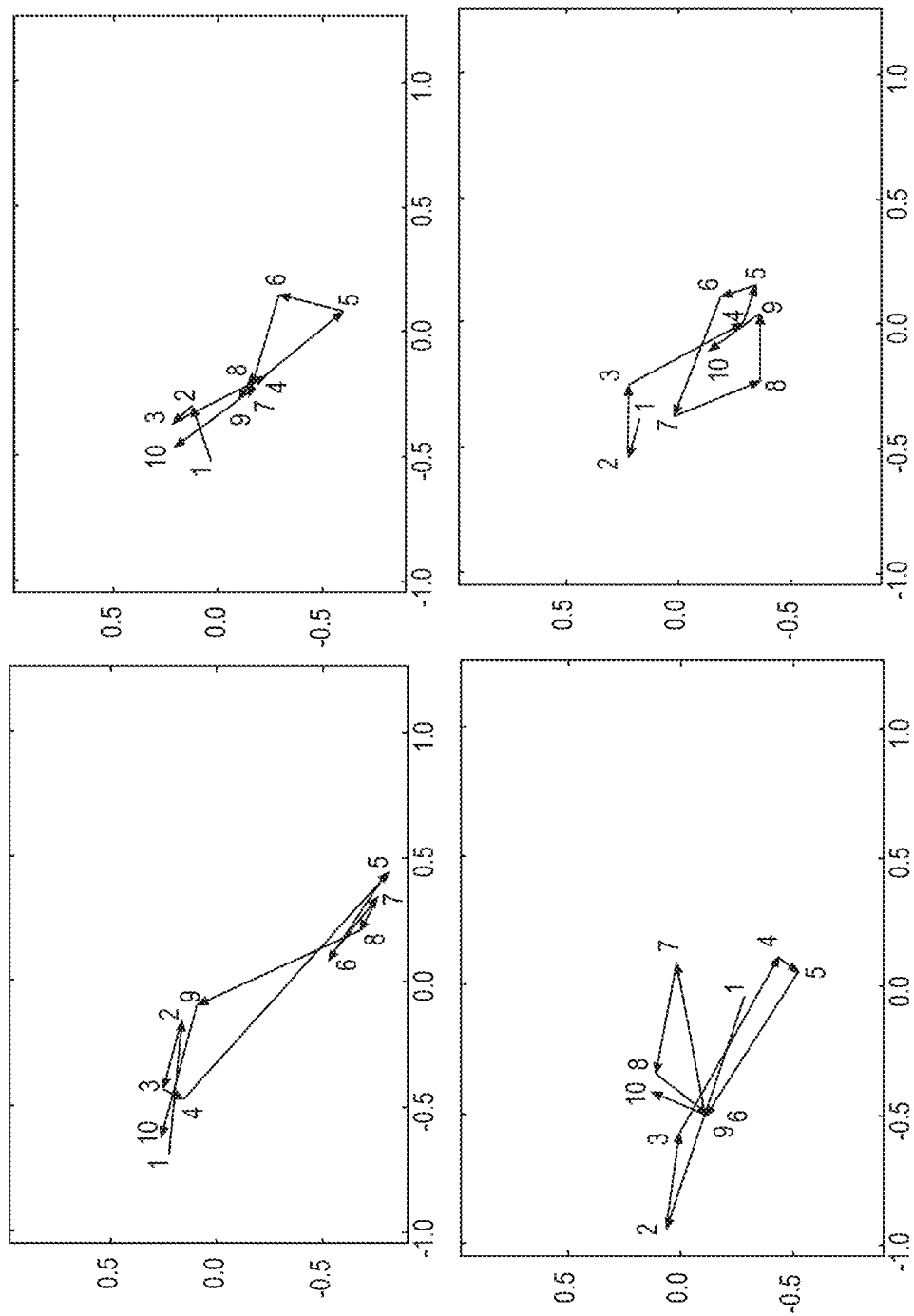
FIG. 8  EXAMPLES OF NON-THREATENING NETWORK PROGRESSION PLOTS

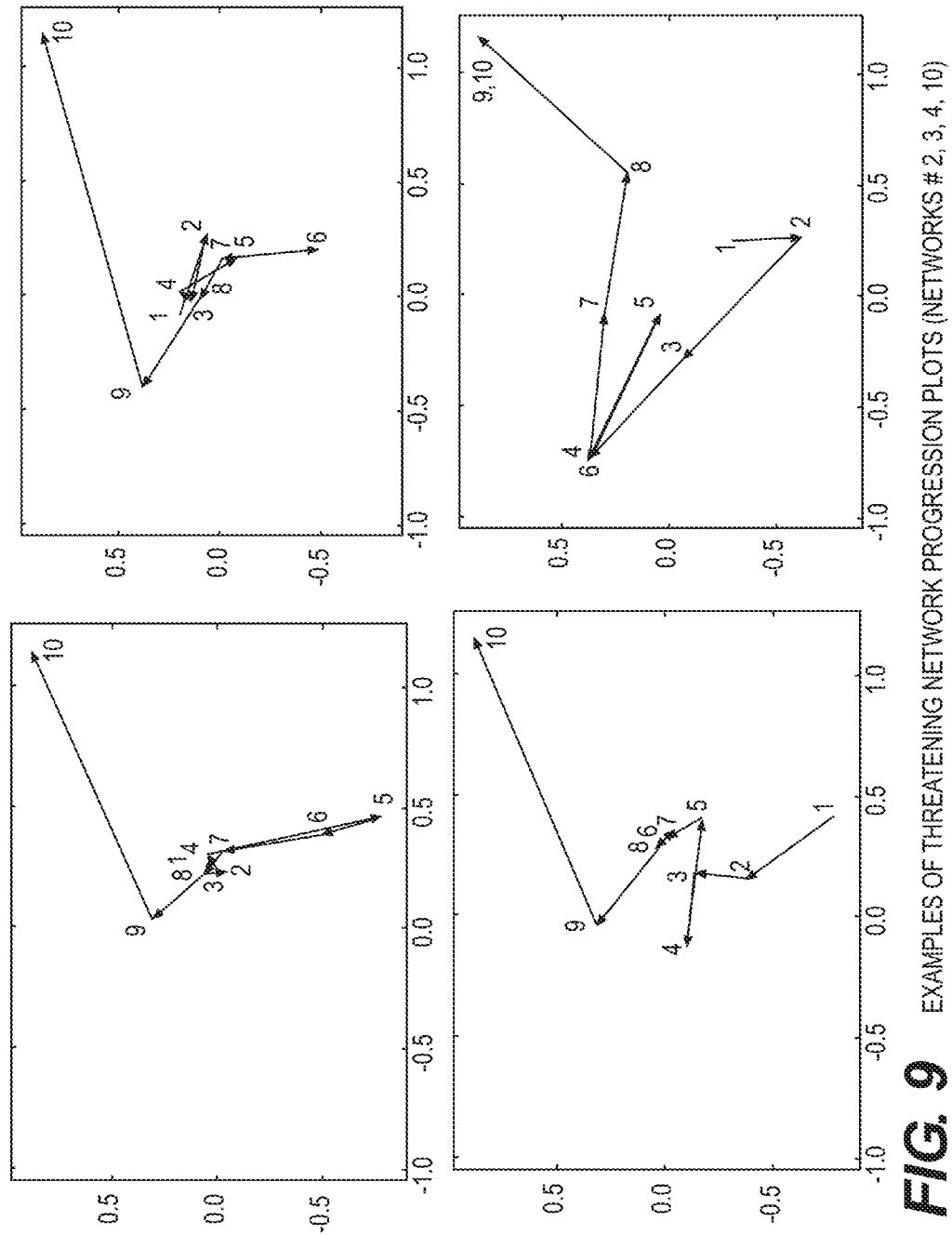
FIG. 9 EXAMPLES OF THREATENING NETWORK PROGRESSION PLOTS (NETWORKS # 2, 3, 4, 10)

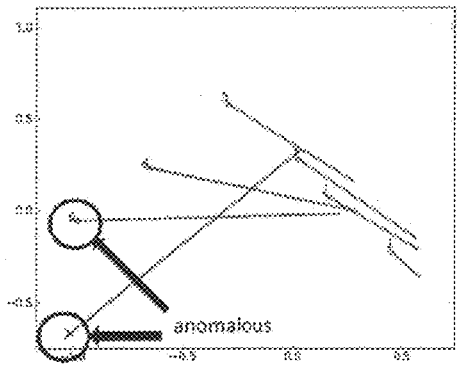

Figure 12: Based on Twitter data based predominantly in Kabul, Afghanistan, seven stable networks were found and networks #6 and #7 were found to be anomalous through network analysis.

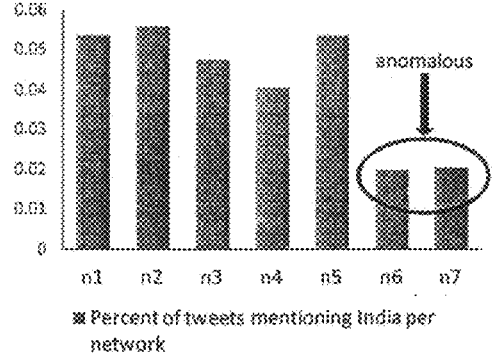

Figure 13: Ground truth determined from tweet content

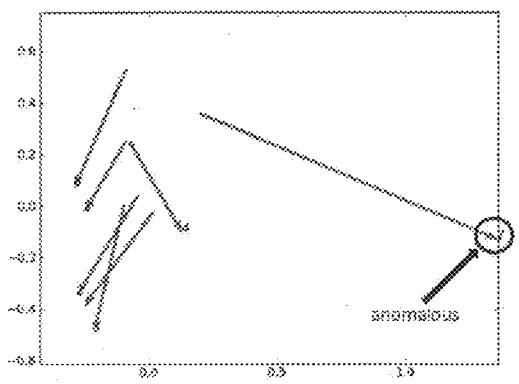

Figure 14: Based on Twitter data predominantly from the United States, seven stable networks were found. One was found to be anomalous through network analysis.

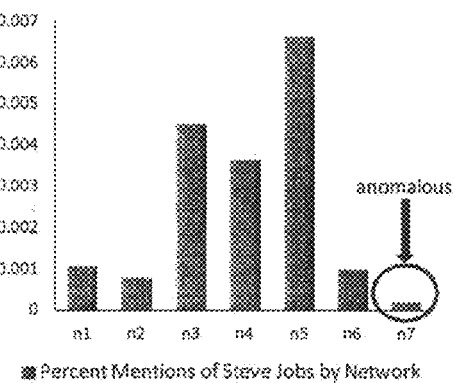

Figure 15: Ground truth determined from tweet content

METHOD AND APPARATUS FOR IDENTIFYING A THREATENING NETWORK

This application claims benefit of priority from U.S. Provisional Application No. 61/581,473, filed Dec. 29, 2011.

Embodiments of the invention were made with government support under contract number N00014-09-C-0262 awarded by the Office of Naval Research. The government has certain rights in the invention.

FIELD OF THE INVENTION

Embodiments of the method and apparatus claimed herein relate to the field of intelligence analysis.

BACKGROUND OF THE INVENTION

Link-based data, which captures connections or relationships between entities (people, locations, organizations, IP addresses, etc.), is an important type of information for intelligence analysis. The rapid advancement and spread of information and communications technology, combined with capabilities for monitoring the use of this technology, results in large volumes of link-based data. Automated tools are needed to exploit this type of data, to reveal the structure of the underlying human and computer networks and identify behavior that indicates threatening activity.

SUMMARY OF THE INVENTION

The present invention is directed to a system and method for identifying a threatening network. The system comprises a network movement before/after algorithm that provides a graphical plot of changes in networks' communications activity from before to after a key event occurs, so that an analyst is able to identify anomalous behavior; a network progression algorithm that provides a graphical plot to analyze behavior in small increments of time without specification or emphasis upon a particular event, so that the analyst is able to see a trend in behavioral changes and identify events that may be of interest; a statistical network anomaly ranking algorithm that provides as output a ranked list of the networks; and an anomaly trend graphs algorithm that analyzes and visualizes the networks' anomaly scores over time, so that the analyst is able to see which networks are consistently suspicious, which networks accumulate more suspiciousness in response to an event, and which networks are trending toward more suspiciousness. The method comprises similar limitations that correspond to the above-mentioned system, as described below.

BRIEF DESCRIPTION OF THE DRAWINGS

The detailed description may refer to the following drawings, wherein like numerals refer to like elements, and wherein:

FIG. 1 illustrates an exemplary Poisson sampling process, in accordance with embodiments of a method and apparatus of identifying a threatening network;

FIG. 2 illustrates an exemplary network movement from before to after an event, in accordance with embodiments of a method and apparatus of identifying a threatening network;

FIG. 3 illustrates exemplary network progression plots over time, in accordance with embodiments of a method and apparatus of identifying a threatening network;

FIG. 4 illustrates an exemplary plot of networks during a non-event time span, in which no clear anomaly is apparent, in accordance with embodiments of a method and apparatus of identifying a threatening network;

FIG. 5 illustrates exemplary anomaly trend graphs over time, in accordance with embodiments of a method and apparatus of identifying a threatening network;

FIG. 6 illustrates an exemplary plot of networks in reaction to the arrival of the Marines, in which networks #4 and #10 are clearly anomalous, in accordance with embodiments of a method and apparatus of identifying a threatening network;

FIG. 7 illustrates an exemplary plot of networks in response to the removal of a key leader, in which network #10 is clearly anomalous, in accordance with embodiments of a method and apparatus of identifying a threatening network;

FIG. 8 illustrates exemplary non-threatening network progression plots, in accordance with embodiments of a method and apparatus of identifying a threatening network;

FIG. 9 illustrates exemplary threatening network progression plots, such as networks #2, #3, #4, and #10, in accordance with embodiments of a method and apparatus of identifying a threatening network;

FIG. 12 illustrates an exemplary plot of networks, in which networks #6 and #7 were found to be anomalous through network analysis of Twitter activity, in accordance with embodiments of a method and apparatus of identifying a threatening network;

FIG. 13 illustrates the pattern of anomaly of FIG. 12 corresponding to ground truth determined from tweet content, in accordance with embodiments of a method and apparatus of identifying a threatening network;

FIG. 14 illustrates an exemplary plot of networks, in which network #7 was found to be anomalous through network analysis of Twitter activity, in accordance with embodiments of a method and apparatus of identifying a threatening network; and FIG. 15 illustrates the pattern of anomaly of FIG. 14 corresponding to ground truth determined from tweet content, in accordance with embodiments of a method and apparatus of identifying a threatening network.

DETAILED DESCRIPTION OF THE PREFERRED EMBODIMENTS

Figure 10A:
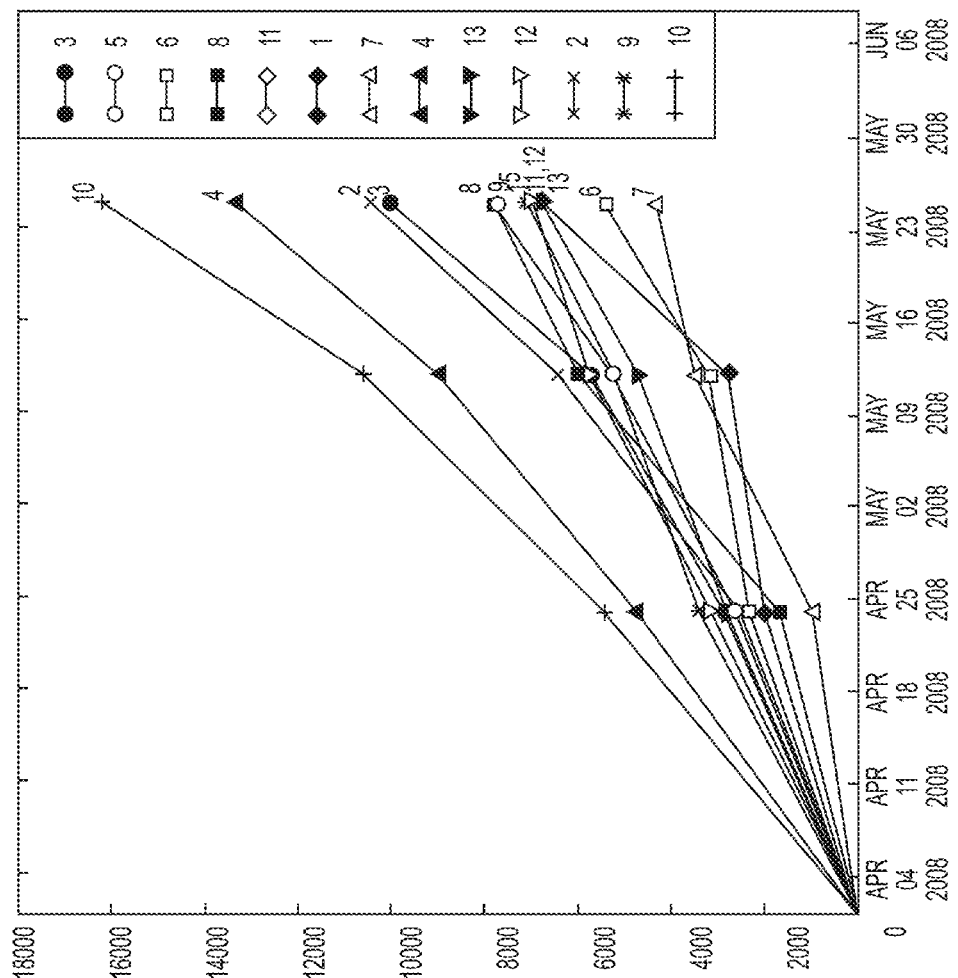
FIGS. 10A-C illustrate exemplary anomaly trend graphs, in accordance with embodiments of a method and apparatus of identifying a threatening network.

Networks of interest in intelligence analysis can be identified by exposing suspicious behavior based on anomalous responses to stimuli. This capability of identifying threatening networks based on their response to key events is referred to as asymmetric threat signatures (AT-SIG). AT-SIG's anomaly detection approaches can be used to identify threatening networks, detect unknown events, separate true positives from false positives, and ultimately allow an analyst to focus on the events or networks of most critical importance. These applications may include but are not limited to the human, social media or cyber domain.

For each of these domains, although the data ingested by the apparatus may change, the AT-SIG algorithms, in embodiments, do not change. For example, the transactional data may be cell phone records, IP addresses, or usernames or links in social media. Graphs provide a natural means for representing information found in communications, social media, and cyber data, including information about terrorists, insurgents, computer networks and other entities that may be of interest. Nodes may represent persons, groups, articles, and photos in social media, or host and server machines on a network, with edges representing communications or other associations among them. Used in this way, a graph can capture activity within a network and analyzed for suspicious behavior.

An objective of AT-SIG is to identify threatening networks based on their responses to stimuli. The inventors of the present invention have found that (1) threatening networks behave differently in response to (or anticipation of) an event than non-threatening networks; (2) the difference in behavior is evident in network transaction data; and (3) the anomalous changes of threatening networks can be detected by analyzing social network analysis (SNA) metrics. A formal statement regarding these points may be formulated as, "If a network's communication patterns in response to a stimulus are related to its threat level, then networks of interest can be identified via dynamic analysis of SNA metric signatures."

Embodiments of a method and apparatus for identifying a threatening network can help alleviate overloaded analysts by assisting them in narrowing down a large set of networks to those most likely to be of interest. In addition to exposing suspicious networks, embodiments of the method and apparatus for identifying a threatening network can also be used to anticipate responses of threatening networks to changing conditions, and recognize events that are related to behaviors of interest, in order to ultimately save lives. The capability helps to provide automatic and timely detection, identification, and tracking of networks of interest and ultimately improves situational awareness.

In addition to identifying human networks or other entities that may be suspicious or threatening (e.g., from communications intelligence or social media data), one can attack cyber security issues using the AT-SIG anomaly detection approach. Cyber security analysts often spend much time investigating the large number of false alarms generated by intrusion detection systems and may not even have enough time to investigate them all. AT-SIG can be used to determine if events detected are significant or insignificant, such as whether an identified "threatening" event on a cyber network is a true attack or false alarm. AT-SIG could also be used to identify which networks were involved in perpetrating the event. Furthermore, a cyber analyst or intrusion detection system monitoring network traffic is inevitably going to miss some true positives (i.e., admits false negatives by declaring an activity as non-threatening when it actually is threatening). AT-SIG's anomaly detection can be used to catch the anomalous networks and behaviors that are likely to be threatening activity, such as intrusions into a network.

Preferably, network rosters have already been determined by another means. A method of discovering networks from network transaction data (source, destination, timestamp), and tracking networks over time based on membership and structure is disclosed in U.S. Pat. No. 7,480,712 to Moy and incorporated herein by reference. A commercially-available tool, the DAGGAR System Platform (DSP), provided by 21st Century Technologies, Inc., can perform this task. Once a network has been identified, embodiments of the method and apparatus for identifying a threatening network can be used to determine whether or not the network has a high likelihood of being threatening.

Without being limited by theory, embodiments of the method and apparatus for identifying a threatening network operate on the assumption that most networks are not threatening, and therefore the threatening networks are the anomalous networks.

Embodiments of the method and apparatus for identifying a threatening network focus on examining SNA metrics before and after an event in order to identify networks that are behaving abnormally. An example of a (hypothetical) situation in which SNA metrics of a civilian network are different than those of an adversarial network is illustrated in Table 1, and described in the paragraph below.

TABLE 1

Example scenario contrasting SNA metrics of adversarial and civilian networks before and after the bombing of a major town center

| | | Adversarial Network | |
|---|---|---|---|
| | | SNA observation | Driving Social Goal |
| BEFORE | | Characteristic path length large (avg. distance between pairs of nodes) | Minimize likelihood of detection by using intermediaries in communications |
| | | Density small (ratio of existing links to possible links) | Seek efficient planning/execution; minimize likelihood of detection |
| AFTER | | External communications decrease | Focused on internal coordination |
| | | Density increase | Organizing quick response to take advantage of condition; less concern with avoiding detection |
| | | Clustering coefficient increase | Tight-knit communications and coordinated response |
| | | Civilian Network | |
| | | SNA observation | Reason |
| BEFORE | | Characteristic path length small | Socialize with various acquaintances, talk directly without going through intermediaries |
| | | Density large | Communicating freely with little restriction |
| AFTER | | External communication increase | Notifying distant relatives, seeking outside assistance, etc. |
| | | Density decrease | Communications disrupted |
| | | Clustering coefficient decrease | Disorganized |

Suppose there is a bombing in a major center of town. Before the event, one would expect an adversarial network that is planning the bombing to minimize the likelihood of others detecting their activity by using intermediaries in their communications, which could result in a large characteristic path length (average distance between pairs of nodes). This network would also be seeking efficient planning and execution of their task, which could result in a small density measure (ratio of existing links to all possible links). On the other hand, the civilian networks may be socializing with various acquaintances and communicating freely and directly with little restriction, which yields a small characteristic path length and large density. Then, once the bombing occurs, the adversarial network becomes focused on internal coordination and executing their organized response to the event to take advantage of the condition with less concern about avoiding detection, so their communications with persons outside their network will decrease while the internal communications density increase. They may also have more tight-knit communications as they coordinate their response, which would cause the clustering coefficient (measure of the degree to which nodes in a graph tend to cluster together) to increase. Meanwhile, after the event occurs, the civilian networks begin notifying distant relatives and seeking outside assistance, so their external communications increase. They may have disrupted channels of communication, which would cause their density to decrease, and they are likely to be very disorganized so that their clustering coefficient is decreased. Thus, in this example, one can see that it makes intuitive and logical sense for civilian and adversarial networks to behave differently before and after a key event.

Embodiments of the method and apparatus for identifying a threatening network employ anomaly detection, such that it is not necessary to have an a priori determination of what behavior constitutes a threat. The risk of not having sufficient data for training and building a model is mitigated since no training of a model is required. Embodiments of the method and apparatus for identifying a threatening network detect anomalous—and assumed suspicious—changes in the communication patterns of networks in anticipation of and response to events in order to identify networks of interest. SNA metrics preferably are used to analyze network transaction data (source, destination, timestamp) and apply statistical techniques and anomaly detection methods, such as principal component analysis, multi-dimensional clustering, and outlier detection. Embodiments of the method and apparatus for identifying a threatening network identify as suspicious those networks that respond differently to an event than "typical" networks, and recognize when networks are trending toward threatening behavior.

The software implementation of embodiments of the method and apparatus for identifying a threatening network takes as input the roster of a network discovered from vast amounts of relational data, such as cell phone call externals or network IP addresses. There are, for example, preferably four algorithms implemented in the software implementation, with varying input parameters for each. Each algorithm provides a different visualization or textual output based on its approach for identifying threatening networks. Embodiments of the method and apparatus for identifying a threatening network (i.e., AT-SIG) provide a toolkit of anomaly detection methods to help the analyst determine which networks may be of interest, so that the analyst can narrow his or her focus. Exemplary algorithms include:

An exemplary network movement before/after algorithm plots the movement of multi-dimensional network "behavior signatures" before and after an event (in a projected two-dimensional space) so that analysts can identify anomalous behavior.

An exemplary network progression algorithm plots incremental changes in network behavior over time, not specifically tied to any event, so that analysts can identify trends in behavior and identify events that may be of interest.

An exemplary statistical network anomaly ranking algorithm outputs a ranking of the networks according to their communication behavior's distance as an outlier, so that analysts can focus on networks most likely to be of interest.

An exemplary anomaly trend graphs algorithm plots network anomaly scores over time, so that analysts can see which networks are consistently or increasingly behaving abnormally over time, instead of only having a static ranking of anomaly status.

Exemplary parameters, experiments, and results for each of these four algorithms are provided below.

Evaluation Data

An embodiment of the method and apparatus for identifying a threatening network was evaluated on a ground truthed dataset that includes thirteen detected networks, numbered 1 through 13, four of which are deemed "threatening," based on the high percentage of threatening individuals (as identified by a subject matter expert familiar with the individuals) in the network with significant influence (as determined by the "member significance" metric in the DSP tool) in the network. Thus, an embodiment of the method and apparatus for identifying a threatening network was evaluated based on a ground truth determination that these networks—numbers 10, 4, 2, and 3—are threatening.

In an experiment, a subject matter expert identified three key events in this dataset. The first is the arrival of the U.S. Marines to the region. The second is the removal of a key threatening leader, and the third is the raid of an insurgent's home. These events are used as a stimulus for the experiments. In a similar fashion in the cyber domain, key events may be those detected by an intrusion detection system.

Measures of Performance

In the assessment of performance in this experiment, the adjective "threatening" is used for the ground truth label, and the adjective "suspicious" is used for the label derived from AT-SIG's analysis. Therefore, a correct analysis will be whenever AT-SIG identifies a threatening network as suspicious. Embodiments of the method and apparatus for identifying a threatening network aim to ensure a balance between missed alerts (false negatives) and false positives that is acceptable to an analyst.

A true positive (TP) denotes when a threatening network is classified as suspicious and a false positive (FP) denotes when a non-threatening network is classified as suspicious. If T denotes True, F denotes False, P denotes Positive, and N denotes Negative, measures of performance may be defined as follows. Accuracy, calculated as (TP+TN)/(P+N)

is the percentage of networks correctly classified. The sensitivity, or true positive rate, is the percentage of threatening networks classified as suspicious, given by (TP)/(TP+FN)

The specificity, or true negative rate, is the percentage of non-threatening networks classified as non-suspicious, given by (TN)/(TN+FP)

The baseline measure that embodiments of the method and apparatus for identifying a threatening network seek to improve upon is when all networks are classified as non-threatening, yielding a baseline accuracy of 0.69 (or 9/13). Embodiments of the method and apparatus for identifying a threatening network intends to help analysts narrow down vast amounts of data to networks of interest. Therefore, the specificity is particularly important to indicate success in correctly eliminating networks that are not threatening.

Approach Details

Provided below are exemplary sequences of steps for each of the four exemplary algorithms that implement embodiments of the method and apparatus for identifying a threatening network.

The network movement before/after algorithm provides a graphical plot of the change in the networks' communications activity from before to after a key event occurs, so that an analyst can identify anomalous behavior.

Step 1: The analyst specifies the date (start and end time) of some key event known to be of interest.

Step 2: The analyst selects SNA metrics of interest.

Step 3: The analyst selects time interval duration.

Step 4: An embodiment of the method and apparatus for identifying a threatening network performs the following steps, i-iv, twice—once for the network data before an event and then for the network data after the event.

i. Assign weights to the edges between the pairs of nodes in the network equal to the average frequency of communications between those nodes as they appear in the time interval duration (e.g. "Bob talks to Carol 4.2 times/week"). For each edge, the weight is used as the lambda parameter (mean and standard deviation) of a Poisson random variable. Preferably the random variables for the number of communications per time interval are all independent.

ii. Randomly sample from the Poisson distributions of these edges to create a sample of each of the original networks. FIG. 1 illustrates an example of this process. If computing weighted metrics, each of the samples in the right of the figure could have weights on the edges to represent the number of communications between the two nodes.

iii. Compute the M metrics for the network samples. This will generate a matrix that is N networks×M metrics in size.

iv. Repeat steps ii-iii multiple times (e.g., 100) to generate multiple metric samples for each network.

The results of these steps are a set of metric samples for each network before the event date ("before" samples) and a set of SNA metric samples for each network after the event date ("after" samples).

Step 5: An embodiment of the method and apparatus for identifying a threatening network combines the before and after samples and uses this to determine the minimum and maximum values of metrics across networks and across samples. An embodiment of the method and apparatus for identifying a threatening network then normalizes all metric values such that the smallest value of a metric across samples and networks is 0 and the largest value of a metric across samples and networks is 1.

Step 6: The main method of analysis used by an embodiment of the method and apparatus for identifying a threatening network is Principal Component Analysis (PCA), which is used to compute dimensionality-reducing transformations of the metric data that preserve the most variance in the data (Jolliffe 2002). PCA may be computed based on the M×M covariance matrix of the combined, normalized metric samples. For ease of visualization, the two-dimensional PCA basis is selected for projection, using the two most significant principal components.

Step 7: Given the two-dimensional basis returned by PCA, an embodiment of the method and apparatus for identifying a threatening network projects the normalized before and after samples.

Step 8: For each network, an embodiment of the method and apparatus for identifying a threatening network computes the centroid of the samples before the event, and the centroid of the samples after the event. An embodiment of the method and apparatus for identifying a threatening network computes the centroid values in each dimension as the average sample value for that dimension, then plots a vector such that the tail is located at the centroid of the samples before the event and the head of the vector is located at the centroid of the samples after the event. Therefore, there are N vectors, where N is the number of networks in the dataset. See FIG. 2 for an example.

Step 9: The analyst visually compares the magnitude and direction of the vectors for all the networks in order to identify which networks are behaving anomalously. For example, most of the network vectors may be of medium length and point up to the right, whereas one network vector is extremely long and points up to the left. In FIG. 2, for example, Network 10 is clearly the anomalous network. The analyst can then manually identify that the anomalous vector labels the network as suspicious.

The network progression algorithm provides a graphical plot in a similar fashion as that of the network movement plots described above. However, in contrast to the network movement before/after algorithm, which analyzes behavior surrounding a specific event, the network progression algorithm analyzes behavior in small increments of time without specification or emphasis upon particular events, so that an analyst can see trends in behavioral changes and identify events that may be of interest based on their impact on networks. Therefore, instead of generating a single vector for each network based upon the time before the event and the time after the event, time is divided into smaller segments (disregarding events), and then vectors are plotted for each consecutive window of time.

Step 1: The analyst specifies the start and end time of the data to be analyzed.

Step 2: The analyst selects SNA metrics of interest.

Step 3: The analyst specifies the length of the time interval in which the data will be divided.

Step 4: An embodiment of the method and apparatus for identifying a threatening network combines the metric across all the time intervals and uses this to determine the minimum and maximum values of metrics across networks and across samples. An embodiment of the method and apparatus for identifying a threatening network then normalizes all metric values such that the smallest value of a metric across samples and networks is 0 and the largest value of a metric across samples and networks is 1.

Step 5: An embodiment of the method and apparatus for identifying a threatening network uses PCA to determine the linear combination of metrics that provides the most variance in the data. An exemplary discussion of this technique can be found in Jolliffe, I. T., 2002. *Principal Component Analysis*, Springer Series in Statistics, $2^{nd}$ ed., Springer, N.Y., incorporated herein by reference. An embodiment of the method and apparatus for identifying a threatening network takes the combined, normalized samples and computes the M×M covariance matrix for the metrics. Experimental results indicate that the two or three most significant principal components will sufficiently capture a large portion of the variance. For ease of visualization, the two-dimensional PCA basis is selected for projection, using the two most significant principal components.

Step 6: Given the two-dimensional basis returned by PCA, an embodiment of the method and apparatus for identifying a threatening network projects the normalized data for each time interval.

Step 7: For each network, an embodiment of the method and apparatus for identifying a threatening network computes the centroid of the samples at time t, t+1, t+2, . . . t+n. An embodiment of the method and apparatus for identifying a threatening network computes the centroid values in each dimension as the average sample value for that dimension, then plots vectors such that the tail of the first vector is in the location of the centroid of the network cluster in time t and the head is at time t+1. Then the second vector has a tail in time t+1 with the head in t+2, and so forth. See FIG. 3 for an example, where the labels at the head of each vector indicate the time interval used.

Step 8: The analyst preferably visually compares the progression of the vectors over time for all the networks in order to identify which network are behaving anomalously or trending toward anomalous behavior (e.g., moving farther and farther away from behavior that is typical of most networks). The analyst can then manually identify that the anomalous vector labels the network as suspicious.

The statistical network anomaly ranking algorithm is an iterative anomaly detection approach that provides as output a ranked list of the networks, where Rank 1 is most anomalous.

Step 1: The analyst specifies the date (start and end time) of some key event known to be of interest.

Step 2: The analyst selects SNA metrics of interest.

Step 3: The analyst selects the ranking algorithm (to be described below) to be used: such as PCA-based scoring algorithm or removal rank permutation scoring algorithm.

Step 4: An embodiment of the method and apparatus for identifying a threatening network performs the selected ranking algorithm to identify the most anomalous network in the dataset in response to that event, then removes that network's data.

Step 5: An embodiment of the method and apparatus for identifying a threatening network repeats step 4 to identify the next most anomalous network, and repeats this process until only two networks remain. These two networks are both ranked as the least anomalous.

Step 6: The output of this algorithm comprises a list of the networks and their anomaly ranking, where Rank 1 is preferably most anomalous.

Two exemplary ranking algorithms are provided below. Ranking algorithm 1 is PCA-based scoring. Ranking algorithm 2 is removal rank permutation scoring.

The following illustrates exemplary steps of ranking algorithm 1, PCA-based scoring.

Step 1: An embodiment of the method and apparatus for identifying a threatening network computes network metric samples before and after the event, as in steps i-iv of the network movement before/after algorithm.

Step 2: An embodiment of the method and apparatus for identifying a threatening network computes signatures for each network by subtracting the average of the network's metric samples before the event from the average of the network's metric samples after the event. Each network's signature, then, is a vector of real values, one for each network metric specified.

Step 3: The analyst specifies the number of anomalous networks to be found, which is equivalent to the number of network signatures to remove from the full set of signatures in the following process.

Step 4: An embodiment of the method and apparatus for identifying a threatening network selects a subset of these network signatures, as follows:
  a. Start with the full set of network signatures as the "working set."
  b. Compute a PCA based on the covariance matrix of the working set of signatures.
  c. Project the signatures in the working set using the principal components that account for a specified amount of the variance in the signatures. In the embodiment, all principal components that account for 10% or more of the variance are used.
  d. Compute a score for each projected signature by summing the square of each projection value divided by the associated eigenvalue.
  e. Remove the signature with the highest resulting score from the working set and repeat steps b through e until the number of network signatures specified by the analyst are removed.

Step 5: An embodiment of the method and apparatus for identifying a threatening network computes a PCA based on the covariance matrix of the subset of network signatures resulting from step 4. This PCA is referred to as the "scoring PCA."

Step 6: An embodiment of the method and apparatus for identifying a threatening network derives a projection for the network signatures that uses the principal components from the scoring PCA that account for a specified amount of the variance in the signature subset. In an embodiment, all principal components that account for 10% or more of the variance are used.

Step 7: Using the projection derived in step 6, an embodiment of the method and apparatus for identifying a threatening network projects all network signatures. An embodiment of the method and apparatus for identifying a threatening network computes a score for each network based on this projection by summing the square of each projection value divided by the associated eigenvalue from the scoring PCA.

Step 8: An embodiment of the method and apparatus for identifying a threatening network ranks the networks in descending order according to these scores.

The following illustrates ranking algorithm 2, removal rank permutation Scoring.

Step 1: An embodiment of the method and apparatus for identifying a threatening network computes network metric samples before and after the event, as in steps i-iv of the network movement before/after algorithm.

Step 2: An embodiment of the method and apparatus for identifying a threatening network computes signatures for each network by subtracting the average of the network's metric samples before the event from the average of the network's metric samples after the event. Each network's signature, then, is a vector of real values, one for each network metric specified.

Step 3: For each size-k subset of metrics from the set of metrics chosen by the analyst, an embodiment of the method and apparatus for identifying a threatening network computes a ranking of the networks. In an embodiment, k=2 gives the best performance. Each ranking will contain N−2 networks, where N is the total number of networks. This ranking may be performed as follows:
  a. Start with the full set of network signatures as the "working set" and an empty "ranking list."
  b. Compute a PCA based on the covariance matrix of the working set of signatures.
  c. Project the signatures in the working set using the principal components that account for a specified amount of the variance in the signatures. In an embodiment of the method and apparatus for identifying a threatening network, all principal components that account for 10% or more of the variance are used.

d. Compute a score for each projected signature by summing the square of each projection value divided by the associated eigenvalue.

e. Add the network with the highest scoring signature to the end of the ranking list and remove its signature from the working set. Repeat steps b through e until only two networks remain. These two networks will not appear in the returned ranking.

f. Return the ranking list, which contains the networks in rank order.

Step 4: An embodiment of the method and apparatus for identifying a threatening network computes the overall score for each network based on the ranks from each size-k subset of metrics. An exemplary method for computing this score is, for each network:

a. Initialize the network's score to 0.

b. For each ranking from the size-k subset of metrics:
if the network does not appear in the ranking, do nothing else, get the index i of the network in the ranking list (indices start at 1), and add N−i−1 to the network score, where N is the total number of networks The anomaly trend graphs algorithm is designed for analyzing and visualizing networks' anomaly scores over time. This algorithm lets an analyst see which networks are consistently suspicious, which ones accumulate more suspiciousness in response to an event, which ones are trending toward more suspiciousness, etc. Similarly, one may interpret the behavior as an indication of how the effects of a threatening event (e.g., intrusion into a computer network) are propagating through the networks.

Step 1: The analyst specifies the dates of events in the dataset.

Step 2: An embodiment of the method and apparatus for identifying a threatening network computes anomaly scores for all networks for each event, according to one of the statistical network anomaly ranking algorithms described above.

Step 3: Based on these results, an embodiment of the method and apparatus for identifying a threatening network plots each network's accumulated anomaly score over time. The data points on the line graphs correspond to the events in the dataset. See FIG. 4 for an example.

Results and Discussion

The following describes the experiments and results for each of the algorithms tested, which include: (1) the network movement before/after algorithm; (2) the network progression algorithm; (3) the statistical network anomaly ranking algorithm; and (4) the anomaly trend graphs algorithm.

Experiments for the Network Movement Before/after Algorithm

The network movement before/after algorithm provides a graphical plot of the change in the networks' communications activity from before to after the occurrence of a key event, so that an analyst can identify anomalous behavior. This algorithm is used to test if threatening networks behave differently in general, or if an event stimulus is key to exposing the threatening networks. FIG. 4 shows the resulting plot of scattered behavior results when a non-event time span is used, with no consistent patterns or clearly anomalous network.

The results indicate that in a normal, non-event time span, threatening networks do not necessarily behave differently. Rather, it needs a stimulus to cause the networks' behavior to become anomalous. In other words, it is important to use an event to identify the threatening networks. For example, when the Marines arrive, the resulting behavior is shown in FIG. 6. A consistent pattern is shown in which most of the networks are pointing downward, while networks #10 and #4 are clearly anomalous as they point upward. These two anomalous networks are true positives according to ground truth—they are correctly identified threatening networks.

FIG. 7 shows behavior when a key threatening leader is removed. All networks are consistently moving up to the right, except a single anomaly, network #10, that is moving drastically up to the left. This is a true positive according to ground truth, as #10 is a threatening network.

While this method does not reveal all threatening networks, FIG. 6 and FIG. 7 indicate the network movement plots are effective for enabling an analyst to identify some threatening networks, based on their anomalous behavior before and after an event.

Discussion

Table 2 summarizes the results of the experiments with the network movement before/after algorithm. The table is divided according to the event used as the stimulus and notable values are in a bold font (e.g., those that improve upon the baseline of an accuracy of 0.69). For each event, time interval durations of 7 days and of 1 day are considered. The results indicate that there is not a significant difference between these choices of time interval duration.

TABLE 2

Results from analyzing network movement before and after an event

|  | 7 day interval duration | 1 day interval duration |
|---|---|---|
| Event: Arrival of Marines | | |
| Accuracy | 0.85 | 0.85 |
| Sensitivity (TPR) | 0.50 | 0.50 |
| Specificity (TNR) | 1.00 | 1.00 |
| Event: Removal of Key Leader | | |
| Accuracy | 0.77 | 0.77 |
| Sensitivity (TPR) | 0.25 | 0.25 |
| Specificity (TNR) | 1.00 | 1.00 |
| Event: Raid Insurgent's Home | | |
| Accuracy | 0.54 | 0.46 |
| Sensitivity (TPR) | 0.00 | 0.00 |
| Specificity (TNR) | 0.70 | 0.67 |

Table 2 shows that four of the six experiments improved upon the baseline accuracy of 0.69. More specifically, the pair of experiments with the arrival of the U.S. Marines event yielded accuracy of 0.85 and the pair of experiments with the removal of a key leader event yielded an accuracy of 0.77. Of particular note is that the arrival of Marines and removal of key leader had a specificity of 1.00. This means that 100% of the non-threatening networks were declared to be non-suspicious, thus correctly eliminating these from the analyst's focus. The raid of an insurgent's home did not yield acceptable results. This may be due to that event not being significant or large enough to cause a detectable change in behavior.

The results from this set of experiments are important, as they suggest that the approach of examining networks' response to a stimulus is effective in identifying the threatening networks. Without the probe of an event stimulus, the threatening networks may be able to deceive the analyst by appearing to be normal and blending into the background. A stimulus is needed to expose their suspicious behavior and adversarial nature. While this network movement method does not reveal all threatening networks, FIG. 6 and FIG. 7 indicate that the network movement plots are effective for enabling an analyst to identify some threatening networks, based on their anomalous movement before and after an event. In embodiments of the method and apparatus for identifying a threatening network, an analyst preferably makes the final (subjective) labeling of suspicious versus non-suspicious. This feature is further discussed in the statistical anomaly scoring and anomaly trend graph algorithms described below. In alternative embodiments, the labeling of suspicious versus non-suspicious behavior can be done automatically, for example, in an embodiment, based on PCA results.

In an examplary experiment using social media, Afghanistan signs a strategic partnership with India. Within an atmosphere of increasing tensions between Afghanistan and Pakistan, Afghanistan signed a strategic partnership with Pakistan's enemy, India, on Oct. 4, 2011. Between Sep. 29, 2011 and Oct. 7, 2011, we collected tweets from Kabul, Afghanistan. The DSP found seven networks. Two of those networks were found to be anomalous, based on our anomaly detection algorithms.

FIG. 12 shows how the SNA metrics for the seven networks changed from before the event (base of the arrow) to after the event (head of the arrow). The x and y axes represent the values along the top two principal components of a vector-based SNA representation after PCA was applied. The slope of the vectors indicates that networks 7 and, to a lesser degree, 6 were anomalous. This pattern of anomaly corresponds to the ground truth shown in FIG. 13. Those two anomalous networks circled in the plot on the left were the same ones who were least interested in India as measured by their likelihood to tweet about India, shown in the bar graph on the right.

In another examplary experiment using social media, we looked at the death of Steve Jobs. Steve Jobs died on Oct. 5, 2011. We applied DSP and anomaly detection to a network centered around a user in the United States. We again found seven networks within this larger network, and we determined that network 7 was anomalous, based on our analysis as shown in FIG. 14.

To determine if network 7 really was anomalous with respect to the event of the death of Steve Jobs, we counted how often members of all the networks tweeted about Steve Jobs. We see in FIG. 15 that network 7 did indeed tweet less about Mr. Jobs.

Experiments for the Network Progression Algorithm

The network progression algorithm analyzes incremental changes in networks over time in order to identify threatening networks and anticipate when networks are trending toward threatening behavior. The idea is not merely to have a static understanding of how a network responded to a single event in the past, but to have an ongoing representation of the progression in network behavior (potentially changing in response to multiple, unknown events) over time in such a way that can reveal when threatening networks are moving away from the normal behavior and becoming more likely to be of interest or involved in adversarial activities.

For the experiments, the time is divided into 7-day intervals. FIG. 8 provides examples of typical (non-threatening) network metric progression plots for this dataset, when the data is divided according to 7-day windows. Relative to the other network plots shown in FIG. 9, these plots exhibit relatively small movement in the same general area.

FIG. 9 shows network metric progression plots for the threatening networks with the same axes and scales. The networks are more scattered. In the final window of time, the networks end up with drastic movement to the top right corner of the plot. Thus, in this particular experiment, 100% of the threatening networks can arguably be deemed anomalous (i.e., zero false negatives) and all of the arguably anomalous networks are threatening (i.e., zero false positives).

Discussion

As shown in the examples above, the progression plots show positive results in identifying the four threatening networks, with no false negatives or positives in this experiment. This is only a single dataset, so further experiments on other datasets are needed to further confirm this promising performance.

If one is curious what events may have caused the substantial movement in the later time intervals, Table 3 notes in which window of time the key events occurred. For example, the threatening networks responded drastically to the removal of a key leader event.

TABLE 3

Windows of time used in Experiment Set 2

| 7 day window | Event |
|---|---|
| 1 | |
| 2 | |
| 3 | |
| 4 | Arrival of US Marines |
| 5 | |
| 6 | |
| 7 | Raid of insurgent's home |
| 8 | |
| 9 | Removal of key leader |
| 10 | |

Divisions of the data in time intervals other than 7-day windows are tested, and those experiments yielded almost identical results, which suggests a robustness against the choice of window size. Given that this methodology enables an analyst to visually identify anomalous behavior in networks' progression of movement, without the analyst being required to specify dates of key events, this suggests that performance of this algorithm does not depend on knowledge of when events occur. Having a method that does not rely on analyst knowledge of events is a useful tool, since analysts may not always know the occurrence and time of key stimuli.

Experiments for the Statistical Network Anomaly Ranking Algorithm

The statistical network anomaly ranking algorithm is an iterative anomaly detection approach that provides as output a ranked list of the networks, where Rank 1 is most anomalous. The results from experiments with this iterative method show improvement over non-iterative approaches. Different subsets of SNA metrics are tried to determine if there is a subset of metrics that consistently works best at identifying the known threatening networks. The results of these experiments showed that there was not a single subset of SNA metrics that worked well for all of the events. To overcome this challenge, a variation is developed that evaluates all possible size-k subsets of SNA metrics. Several methods are evaluated for combining the results from each subset into an overall anomaly score. The method that achieved the best results computed overall scores by accumulating the networks' ranks from all SNA metric subsets; the network with the lowest overall score, then, is the most anomalous network. Table 4 below shows the results.

The components generated in the PCA are examined more closely to see if threatening and non-threatening networks in the operational dataset are linearly separable using the set of SNA metrics. It is found that, yes, the two classes are linearly separable, but via different components depending on the event used as a stimulus. This means different combinations of metrics are needed to separate the two classes, depending on the event that occurs, and there is no set of PCA components that can separate the networks for all events. Practically speaking, this result indicates that threatening networks respond differently to different events—one cannot expect a pre-determined behavior to result from all threatening networks for any given event.

Discussion

The statistical anomaly ranking method always yields the network (#10) known to most likely be threatening as the most suspicious network of all the networks. Furthermore, in response to the removal of a key leader event, it consistently (100% of the time) ranks the four threatening networks as the four most suspicious networks. In response to the raiding of an insurgent's home event and the arrival of the marines event, it consistently yields three threatening networks in the top five most suspicious networks.

Table 4 provides a summary of the measures of performance for various feature sets. The table is divided according to the event used as the stimulus, the number of features used, and notable values (e.g., those that improve upon the baseline accuracy of 0.69) are in bold.

TABLE 4

Results from statistical anomaly ranking experiments

|  | 2 feature permutations | 4 feature permutations | 6 feature permutations | Best 8 features | Best 9 features | Best 10 features |
|---|---|---|---|---|---|---|
| Event: Arrival of the US Marines |
| Accuracy | 0.85 | 0.69 | 0.69 | 0.69 | 0.69 | 0.69 |
| Sensitivity | 0.75 | 0.50 | 0.50 | 0.50 | 0.50 | 0.50 |
| Specificity | 0.89 | 0.78 | 0.78 | 0.78 | 0.78 | 0.78 |
| Event: Raid of an Insurgent's Home |
| Accuracy | 0.85 | 0.85 | 0.85 | 0.85 | 0.69 | 0.85 |
| Sensitivity | 0.75 | 0.75 | 0.75 | 0.75 | 0.50 | 0.75 |
| Specificity | 0.89 | 0.89 | 0.89 | 0.89 | 0.78 | 0.89 |
| Event: Removal of a Key Leader |
| Accuracy | 1.0 | 0.85 | 0.85 | 1.0 | 1.0 | 1.0 |
| Sensitivity | 1.0 | 0.75 | 0.75 | 1.0 | 1.0 | 1.0 |
| Specificity | 1.0 | 0.89 | 0.89 | 1.0 | 1.0 | 1.0 |

A shown above, all feature sets either met or exceeded the baseline measure. However, using the 2 feature permutations consistently yields the best results, with a 0.85 or 1.0 accuracy for any of the three events. This is a key result, as it suggests that the analyst does not need to be careful to choose the "best" metrics, nor does the feature set need to change with every dataset, but rather one can trust the algorithm to provide acceptable results based on all metric pairs available. The removal of a key leader event was the most effective in exposing the threatening networks, yielding a 0.85 or 1.0 accuracy for all feature sets tested. The specificities are also very high, indicating good performance in eliminating networks that are not threatening. This method is the best at achieving good results, even with the raid of an insurgent's home event, which was previously suspected as being too small of an event to expose the threatening networks. However, the statistical network anomaly ranking algorithm seems to be sensitive enough to capture such small changes.

Experiments for the Anomaly Trend Graphs Algorithm

The anomaly trend graphs algorithm is designed for analyzing and visualizing networks' anomaly scores over time. This algorithm lets an analyst see which networks are consistently suspicious, which ones accumulate more suspiciousness in response to an event, which ones are trending toward more suspiciousness, etc. The idea is to provide a more objective visual tool for analyzing the extent of network anomalies over time, instead of providing subjective plots of metric movement that require an analyst to determine the status of the anomaly (e.g., the network movement before/after algorithm and the network progression algorithm) or providing a static snapshot of their anomalous ranking based on a single event that lacks visibility into the patterns over time (e.g., the statistical network anomaly ranking algorithm).

Figure 10B:
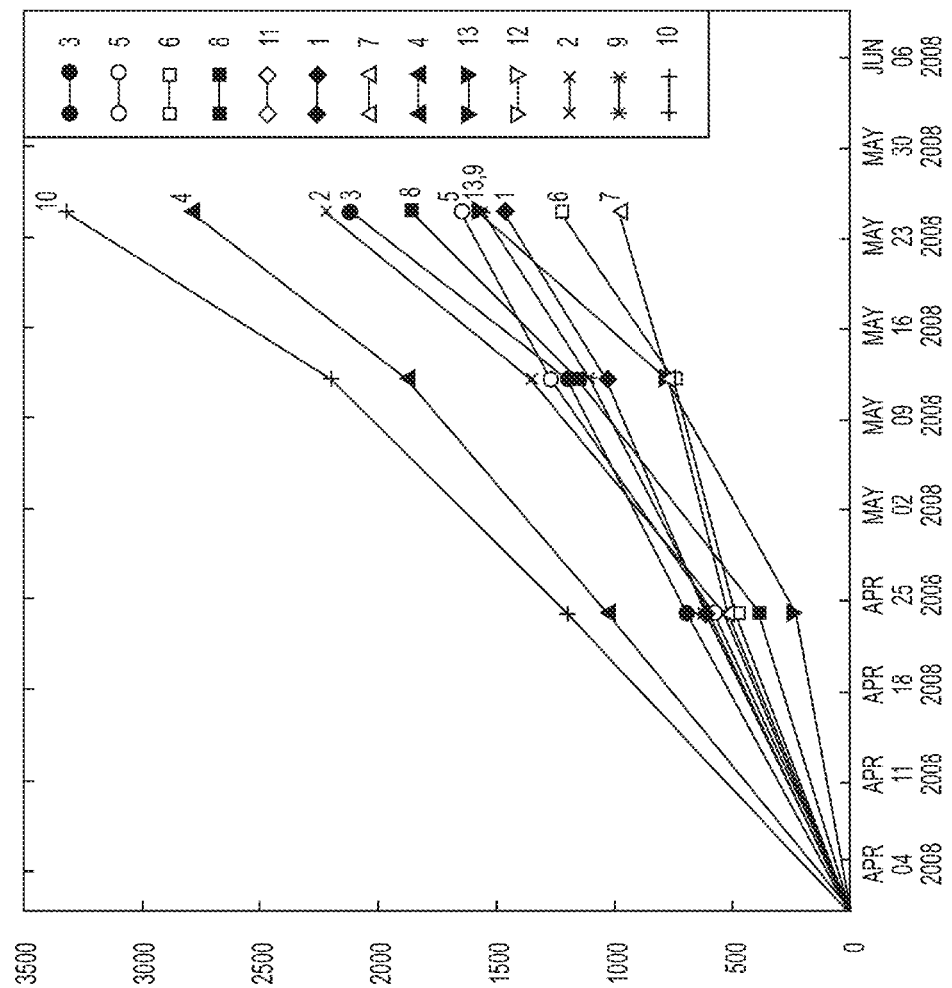
Figure 10C:
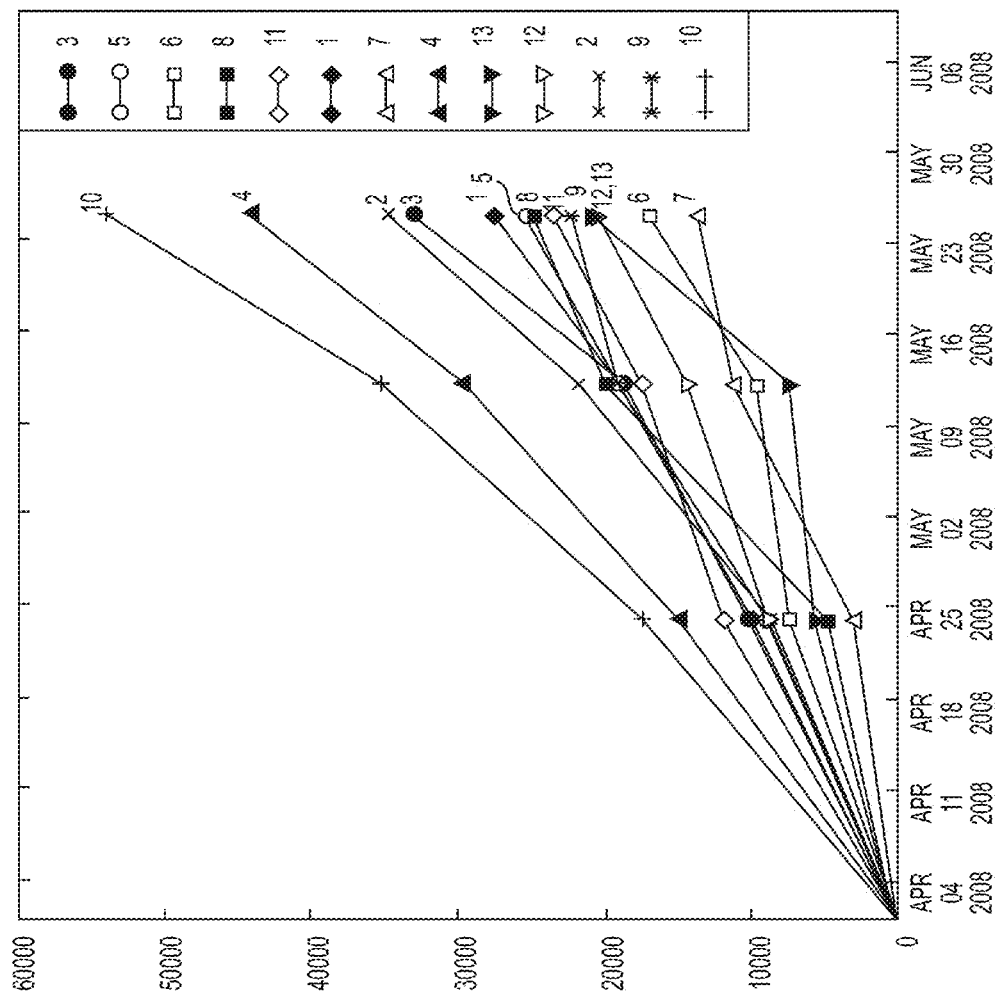

This anomaly trend graphs algorithm is tested using an anomaly scoring method based on the best statistical network anomaly ranking algorithm (described in the previous section), which accumulates ranks from all possible size-k subsets of SNA metrics. For the anomaly trend graphs, higher scores denote higher degrees of anomalousness, so the scoring method is modified from the statistical network anomaly ranking algorithm accordingly. FIGS. 10A-C provide exemplary outputs from this algorithm when tested on the evaluation dataset for k=2, 3, and 4. The three data points on the line graphs correspond to the three events in the dataset.

Discussion

Referring to FIGS. 10A-C, the four threatening networks (#10, 4, 2, 3) are consistently shown to accumulate the highest anomaly scores over time. This method of visualizing the anomaly trends of the networks over time is an effective way of identifying the networks that exhibit threatening behavior or increase their anomaly score, as if to be trending toward more anomalous (and hence suspicious) behavior. This method also reveals which events have more impact on exposing a threatening network, causing them to increase in their outlier distance.

Conclusions

The results of the experiments on operational data indicate: first, threatening networks do behave differently than non-threatening networks in response to an event, as evident in communications activity. Second, examining the response to an event is key to exposing the threatening behavior, as networks are generally not behaving anomalously in a non-event time span. Third, embodiments of AT-SIG methods are able to detect the anomalous changes that occur in response to an event in this dataset.

More specifically, these results demonstrate that suspicious networks can be identified as anomalous by visualizing the movement of their network metric clusters over time, by ranking them according to their calculated suspiciousness score, and by plotting their anomaly scores over time. There is stability in the results, despite varying choices in parameters the analyst can select, which suggests a robustness against human bias when using the tool. The high percentage of correctly determined suspicious networks will help analysts identify the networks of interest from among the vast amounts of data and focus their time and resources on those adversaries.

Furthermore, the experiments indicate that threatening networks respond differently to different events, so there is not a fixed signature or pattern of threatening behavior to be established a priori. Instead, an anomaly detection approach should be used to discover the threatening networks. This is the most adaptable and efficient method for capturing the suspicious behavior of networks that are continually modifying their approaches to remain undiscovered. Anomaly detection is the solution to the challenges of (1) obtaining enough data with ground truth to build an accurate model of normal and threatening behavior; and (2) generalizing the algorithms to apply to threatening behavior in any culture, country, or organization.

Table 5 provides a comparison of the general strengths and weaknesses of the four AT-SIG algorithms described above.

TABLE 5

Comparison of the four AT-SIG algorithms

| Algorithm | Output | Strength | Weakness |
| --- | --- | --- | --- |
| Network movement before/after | Plots of the movement of multi-dimensional network "behavior signatures" before and after an event (in a projected two-dimensional space) | Analyst can visually see the extent of the difference in behavioral change in response to an event | Focuses on change in response to a single known event<br>Preferably uses subjective determination by analysts as to which plots are "typical" and which are anomalous |
| Network Progression | Plots incremental changes in network behavior over time | Analysts can visually see the trends in behavior and anticipate networks becoming farther outliers<br>Focuses on changes over time, not specifically tied to any event | Preferably uses subjective determination by analysts as to which plots are "typical" and which are anomalous |
| Statistical anomaly scoring | Outputs an anomaly ranking of the networks based on their change in communication behavior | Analysts are given which networks are most likely to be threatening, as automatically determined by the algorithm, with no subjective determination required | Focuses on anomalous change in response to a single known event |
| Anomaly trend graph | Plots network anomaly scores over time, revealing networks that are consistently or increasingly behaving abnormally over time | Anomaly scores are determined automatically by the algorithm, with no subjective determination required<br>Focuses on changes over time, so that an analyst can note consistent anomalous behavior | Analyst preferably specifies dates of known events |

Hardware and Software Components

The methods and tools described herein can be implemented in a computer system, including, in an exemplary embodiment, a commercially-available desktop computer that communicates in a client/server configuration over a network with another computer acting preferably as a server computer. The computers may broadly be any device with sufficient computing power, memory and connectivity to be able to interact with the server to perform the functions and methods described herein. The computer may have one or more processors, a persistent storage unit, and a memory that stores the pieces of software being executed by the one or more processors. The persistent storage unit and memory may include any media with sufficient capacity to store the software code and data structures described herein. The memory may include an operating system and one or more modules of software including coded instructions stored in memory or other tangible media that is executed by one or more processors.

Figure 11:
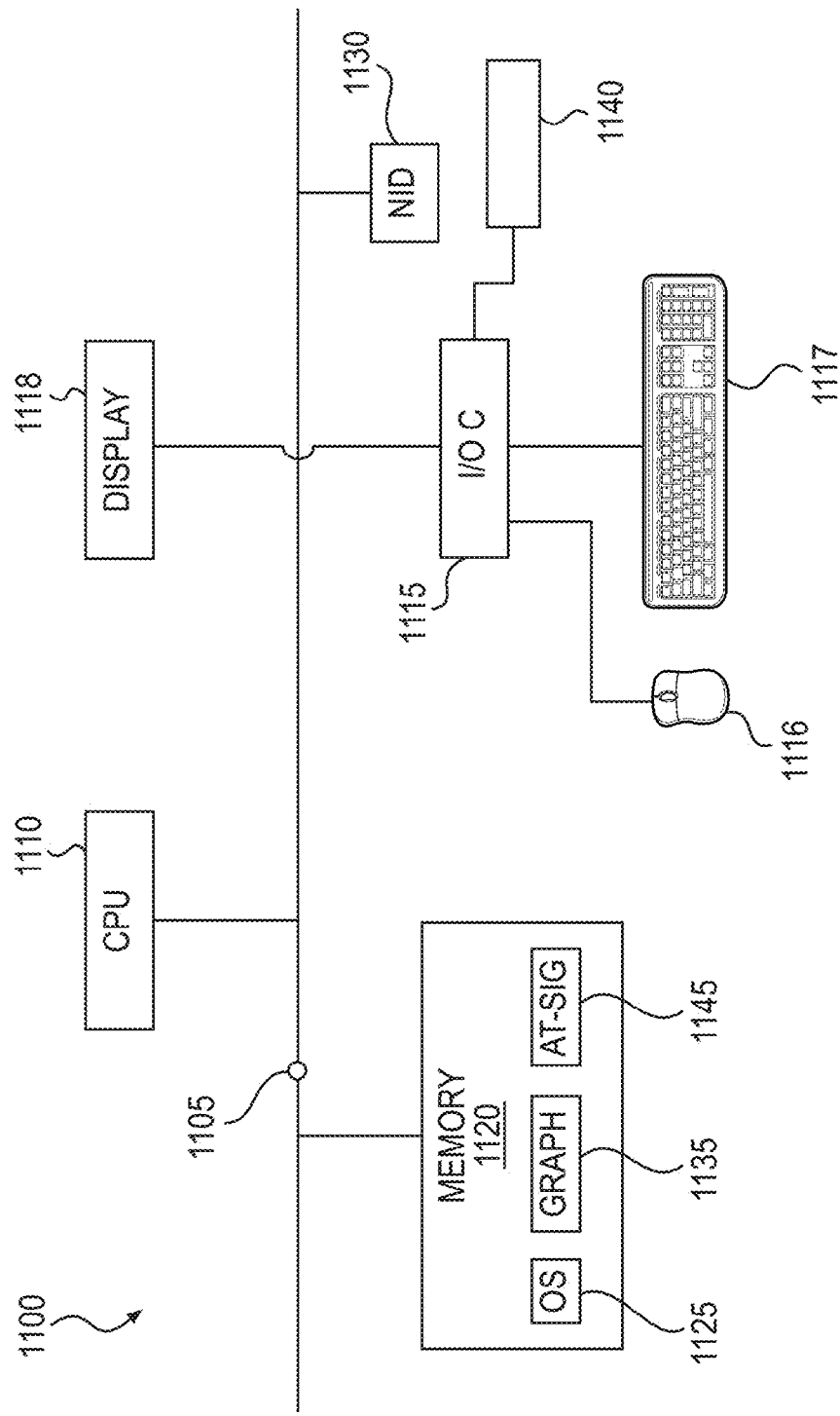
FIG. 11 is a block diagram illustrating exemplary hardware components for implementing embodiments of a method and apparatus for identifying a threatening network.

Referring now to FIG. 11, there is depicted a block diagram representation of a data processing system that may be utilized as device for using asymmetric threat signatures to identify threatening networks (AT-SIG device) device 1100, in accordance with illustrative embodiments of the present invention. The AT-SIG device 1100 may be a symmetric multiprocessor (SMP) system including one or more central processing units (CPU) 1110 connected to memory 1120 via system interconnect/bus 1105. Also connected to system bus 1105 is I/O controller 1115, which provides connectivity and control for input devices, mouse 1116 and keyboard 1117, and output device, display 1118. AT-SIG device 1100 preferably includes a video/graphics chip set or other graphics means (not illustrated) coupled to memory 1120 and/or CPU 1110 and display 1118 and which enables display 1118 to display the graphs and other visual representations generated by the algorithms described herein. Additionally, a multimedia drive 1140 (e.g., CDRW or DVD drive) is coupled to the I/O controller and operates as both an input and an output device.

AT-SIG device 1100 is also illustrated with a network interface device (NID) 1130 with which AT-SIG device 1100 connects to another computer device or computer network (not illustrated). The exact complexity of network devices may range from a simple two device network to a network comprising thousands or more interconnected devices. The computer network may be an intranet or a local area network (LAN). In more complex implementations, the network may be a wide area network (WAN), such as the Internet or any collection of smaller networks and gateways that utilize the Transmission Control Protocol/Internet Protocol (TCP/IP) suite of protocols to communicate with each other. NID 1130 may be a modem and/or network adapter, for example, depending on the type of network and connection to the network. It is however understood that application of the various processes of embodiments of the invention may occur within an AT-SIG device 1100 that is not connected to an external network, but receives the dataset via some other input means, such as multimedia input drive 1140, analyst input, download from thumb drive via USB port, for example. In an alternative embodiment, display 1118 may be remote from and coupled to AT-SIG device 1100 via NID 1130.

Those of ordinary skill in the art will appreciate that the hardware depicted in FIG. 11 is a basic illustration of a computer device and may vary from system to system. Thus, the depicted example is not meant to imply architectural limitations with respect to the present invention. AT-SIG device 1100 may be a data processing system or a computer system, and is described as such herein.

In addition to the above described hardware components of AT-SIG device 1100, various features of embodiments are provided as software code stored within memory 1120 or other storage (not shown) and executed by CPU 1110. Located within memory 1120 and executed by CPU 1110 are a number of software components, including operating system (OS) 1125 (e.g., Microsoft Windows®, a trademark of Microsoft Corp, or GNU®/Linux®, registered trademarks of the Free Software Foundation and The Linux Mark Institute) and software applications, of which an AT-SIG utility 1145 is shown. Preferably OS 1125 comprises software code operative to execute Python code, such as, for example, a Python virtual machine (not shown).

The flexibility of the AT-SIG algorithms means that the algorithms do not require a specific data format for receiving and compiling data. That is, the algorithms are able to process any data that that can be represented as link-based data, where relationships among nodes are known. The AT-SIG algorithms, written in Python, create their own representation after retrieving the activity data from a relational database. Other embodiments comprise implementing some or all of the methods and tools on a hardware device or a combination of hardware and software. In other embodiments the system may be implemented using other computer architectures (for example, a client/server type architecture, a mainframe system with terminals, an ASP model, a peer to peer model, and the like) and other networks (for example, a local area network, the internet, a telephone network, a wireless network, a mobile phone network, and the like), and those other implementations are within the scope of the inventions disclosed herein since the inventions disclosed herein are not limited to any particular computer architecture or network.

AT-SIG utility 1145 comprises software code which when loaded into memory 1120 and executed by CPU 1120, supported by OS 1125, cause the AT-SIG device 1100 to perform the exemplary algorithms and methods illustrated herein, including the network movement before/after algorithm, the network progression algorithm, the statistical network anomaly ranking algorithm, and the anomaly trend graphs algorithm. For simplicity, the collective body of code that enables these various features is referred to herein as AT-SIG utility. According to an illustrative embodiment, when CPU 1110 executes AT-SIG utility 1145, AT-SIG device 1100 initiates a series of functional processes, corresponding to the AT-SIG features/methods/functionality described herein.

CPU 1110 executes AT-SIG utility 1145 as well as OS 1125, which support the execution of AT-SIG utility 1145. In actual implementation, AT-SIG utility 1145 may be loaded on to and executed by an existing computer system to provide the group detection features within that computer system, as described below.

Although embodiments of the present invention has been described in detail, it will be apparent to those skilled in the art that many embodiments taking a variety of specific forms and reflecting changes, substitutions and alterations can be made without departing from the spirit and scope of the inventions disclosed herein. The described embodiments illustrate the scope of the claims but do not restrict the scope of the claims.

What is claimed is:

1. A method for identifying a threatening network, the method comprising:
   providing a dataset comprising communications activity of a plurality of networks;
   performing an AT-SIG algorithm on the dataset;
   displaying a graphic output of the AT-SIG algorithm for each of the plurality of networks; and
   identifying a network having anomalous communications activity by a visual comparison of the graphic output of the AT-SIG algorithm for each of the plurality of networks;
   wherein the AT-SIG algorithm comprises providing a network movement before/after algorithm that provides a graphical plot of changes in networks' communications activity from before to after a key event occurs, wherein the network movement before/after algorithm, after accepting a date of the key event known to be of interest, accepting a selection of a social network analysis (SNA) metrics of interest, and accepting a selection of a time interval duration, performs the steps of:
   1) assigning weights to edges between pairs of nodes in a network equal to the average frequency of communications between the pairs of nodes as the pairs of nodes appear in the time interval duration;
   2) randomly sampling from Poisson distributions of the edges to create a sample of each of the networks, and computing a plurality of SNA metrics for the networks to generate a matrix that is N×M in size, wherein N is the cardinality of the plurality of networks and M is the cardinality of the plurality of SNA metrics; and
   3) repeating steps 1) to 2) multiple times to generate multiple SNA metric samples for each network,
   wherein the network movement before/after algorithm generates a set of SNA metric samples for each network before the date of the key event and a set of SNA metric samples for each network after the date of the key event;
   wherein the AT-SIG algorithm further comprises one or more of the following:
   providing a network progression algorithm that provides a graphical plot to analyze behavior in small increments of time without specification or emphasis upon a particular event;
   providing a statistical network anomaly ranking algorithm that provides as output a ranked list of the networks; and
   providing an anomaly trend graphs algorithm that analyzes and visualizes the networks' anomaly scores over time.

2. The method of claim 1, wherein the network movement before/after algorithm performs the steps of:
   combining the set of SNA metric samples before the date of the key event and the set of SNA metric samples after the date of the key event to determine minimum and maximum values of SNA metrics across the networks and across the samples;
   normalizing all SNA metric values such that the smallest value of a SNA metric across samples and networks is 0 and the largest value of a SNA metric across samples and networks is 1;
   using principal component analysis (PCA) to compute dimensionality-reducing transformations of SNA metric data that preserve the most variance in the SNA metric data;
   projecting normalized set of SNA metric samples before the date of the key event and normalized set of SNA metric samples after the date of the key event;
   computing, for each network, a centroid of the samples before the date of the key event and a centroid of the samples after the date of the key event;

computing centroid values in each dimension as an average sample value for the dimension; and plotting a vector such that a tail of the vector is located at the centroid of the SNA metric samples before the key event and a head of the vector is located at the centroid of the SNA metric samples after the key event.

3. The method of claim 1, wherein the network progression algorithm, after accepting a start time and an end time of data to be analyzed, after accepting a selection of social network analysis (SNA) metrics of interest, and after accepting a specification of a length of a time interval in which the data will be divided, performs the steps of:

combining SNA metrics across all time intervals to determine a minimum value and a maximum value of SNA metrics across the networks and across samples;

normalizing all SNA metric values such that the smallest value of a SNA metric across samples and networks is 0 and the largest value of a SNA metric across samples and networks is 1;

using principal component analysis (PCA) to determine a linear combination of SNA metrics that provides the most variance in the data and computes a M×M covariance matrix for the SNA metrics;

projecting normalized data for each time interval;

computing, for each network, a centroid of the samples at a plurality of time intervals between the start time and the end time;

computing centroid values in each dimension as an average sample value for the dimension; and plotting at least two vectors such that a first vector has a tail in a location of a centroid of a network cluster in a first time interval with a head in a second time interval, and a second vector has a tail in the second time interval with a head in a third time interval, wherein the first time interval is one of the time intervals between the start time and the end time, the second time interval immediately follows the first time interval, and the third time interval immediately follows the second time interval.

4. The method of claim 1, wherein the network anomaly ranking algorithm, after accepting a date of the key event known to be of interest, accepting a selection of a social network analysis (SNA) metrics of interest, and accepting a selection of a ranking algorithm to be used, performs the steps of:

1) performing the selected ranking algorithm to identify the most anomalous network in a dataset in response to the key event, and removes data of the most anomalous network;

2) repeating step 1) to identify the next most anomalous network until only two networks remain, wherein the two remaining networks are both ranked as the least anomalous; and 3) generating an output comprising a list of the networks and associated anomaly ranking.

5. The method of claim 4, wherein the ranking algorithm includes a principal component analysis (PCA)-based scoring algorithm or a removal rank permutation scoring algorithm.

6. The method of claim 1, wherein the anomaly trend graphs algorithm, after accepting dates of events in a dataset, performs the steps of:

computing anomaly scores for all networks for each event using the statistical network anomaly ranking algorithm; and plotting each network's accumulated anomaly score over time, wherein data points on line graphs correspond to the events in the dataset.

7. The method of claim 1, wherein the anomaly trend graphs algorithm provides an indication as to how the effects of a threatening event are propagating through the networks.

8. An asymmetric threat signatures (AT-SIG) system comprising:

one or more processing units;

a display device;

memory media, the memory media comprising a dataset comprising communications activity of a plurality of networks; and instructions which when loaded into the memory media and executed by the one or more processing units cause the AT-SIG device to perform an AT-SIG algorithm on the dataset and to display on the display device a graphic output of the AT-SIG algorithm for each of the plurality of networks;

wherein the AT-SIG algorithm comprises a network movement before/after algorithm that provides a graphical plot of changes in networks' communications activity from before to after a key event occurs, wherein the network movement before/after algorithm, after accepting a date of the key event known to be of interest, accepting a selection of a social network analysis (SNA) metrics of interest, and accepting a selection of a time interval duration, performs the steps of:

1) assigning weights to edges between pairs of nodes in a network equal to the average frequency of communications between the pairs of nodes as the pairs of nodes appear in the time interval duration;

2) randomly sampling from Poisson distributions of the edges to create a sample of each of the networks, and computing a plurality of SNA metrics for the networks to generate a matrix that is N×M in size, wherein N is the cardinality of the plurality of networks and M is the cardinality of the plurality of SNA metrics; and 3) repeating steps 1) to 2) multiple times to generate multiple SNA metric samples for each network, wherein the network movement before/after algorithm generates a set of SNA metric samples for each network before the date of the key event and a set of SNA metric samples for each network after the date of the key event;

wherein the AT-SIG algorithm further comprises one or more of the following:

a network progression algorithm that provides a graphical plot to analyze behavior in small increments of time without specification or emphasis upon a particular event;

a statistical network anomaly ranking algorithm that provides as output a ranked list of the networks; and an anomaly trend graphs algorithm that analyzes and visualizes the networks' anomaly scores over time.

9. The system of claim 8, wherein the network movement before/after algorithm:

combines the set of SNA metric samples before the date of the key event and the set of SNA metric samples after the date of the key event to determine minimum and maximum values of SNA metrics across the networks and across the samples;

normalizes all SNA metric values such that the smallest value of a SNA metric across samples and networks is 0 and the largest value of a SNA metric across samples and networks is 1;

uses principal component analysis (PCA) to compute dimensionality-reducing transformations of SNA metric data that preserve the most variance in the SNA metric data;

projects normalized set of SNA metric samples before the date of the key event and normalized set of SNA metric samples after the date of the key event;

computes, for each network, a centroid of the samples before the date of the key event and a centroid of the samples after the date of the key event;

computes centroid values in each dimension as an average sample value for the dimension; and plots a vector such that a tail of the vector is located at the centroid of the SNA metric samples before the key event and a head of the vector is located at the centroid of the SNA metric samples after the key event.

10. The system of claim 8, wherein the network progression algorithm, after accepting a start time and an end time of data to be analyzed, after accepting a selection of social network analysis (SNA) metrics of interest, and after accepting a specification of a length of a time interval in which the data will be divided:

combines SNA metrics across all time intervals to determine a minimum value and a maximum value of SNA metrics across the networks and across samples;

normalizes all SNA metric values such that the smallest value of a SNA metric across samples and networks is 0 and the largest value of a SNA metric across samples and networks is 1;

uses principal component analysis (PCA) to determine a linear combination of SNA metrics that provides the most variance in the data and computes a M×M covariance matrix for the SNA metrics;

projects normalized data for each time interval;

computes, for each network, a centroid of the samples at a plurality of time intervals between the start time and the end time;

computes centroid values in each dimension as an average sample value for the dimension; and plots at least two vectors such that a first vector has a tail in a location of a centroid of a network cluster in a first time interval with a head in a second time interval, and a second vector has a tail in the second time interval with a head in a third time interval, wherein the first time interval is one of the time intervals between the start time and the end time, the second time interval immediately follows the first time interval, and the third time interval immediately follows the second time interval.

11. The system of claim 8, wherein the network anomaly ranking algorithm, after accepting a date of the key event known to be of interest, accepting a selection of a social network analysis (SNA) metrics of interest, and accepting a selection of a ranking algorithm to be used:

1) performs the selected ranking algorithm to identify the most anomalous network in a dataset in response to the key event, and removes data of the most anomalous network;

2) repeats step 1) to identify the next most anomalous network until only two networks remain, wherein the two remaining networks are both ranked as the least anomalous; and 3) generates an output comprising a list of the networks and associated anomaly ranking.

12. The system of claim 11, wherein the ranking algorithm includes a principal component analysis (PCA)-based scoring algorithm or a removal rank permutation scoring algorithm.

13. The system of claim 8, wherein the anomaly trend graphs algorithm, after accepting dates of events in a dataset:

computes anomaly scores for all networks for each event using the statistical network anomaly ranking algorithm; and plots each network's accumulated anomaly score over time, wherein data points on line graphs correspond to the events in the dataset.

14. The system of claim 8, wherein the anomaly trend graphs algorithm provides an indication as to how the effects of a threatening event are propagating through the networks.

15. An asymmetric threat signatures (AT-SIG) device including one or more processors that execute instructions for identifying a threatening network, the instructions comprising:

executing a network movement before/after algorithm to provide a graphical plot of changes in communications activity of a plurality of networks from before to after a key event occurs, wherein the network movement before/after algorithm, after accepting a date of the key event known to be of interest, accepting a selection of a social network analysis (SNA) metrics of interest, and accepting a selection of a time interval duration, performs the steps of:

1) assigning weights to edges between pairs of nodes in a network equal to the average frequency of communications between the pairs of nodes as the pairs of nodes appear in the time interval duration;

2) randomly sampling from Poisson distributions of the edges to create a sample of each of the networks, and computing a plurality of SNA metrics for the networks to generate a matrix that is N×M in size, wherein N is the cardinality of the plurality of networks and M is the cardinality of the plurality of SNA metrics; and 3) repeating steps 1) to 2) multiple times to generate multiple SNA metric samples for each network, wherein the network movement before/after algorithm generates a set of SNA metric samples for each network before the date of the key event and a set of SNA metric samples for each network after the date of the key event;

executing a network progression algorithm to provide a graphical plot to analyze behavior in small increments of time without specification or emphasis upon a particular event;

executing a statistical network anomaly ranking algorithm to provide as output a ranked list of the networks; and executing an anomaly trend graphs algorithm to analyze and visualize the networks' anomaly scores over time.

* * * * *